Patented Aug. 8, 1933

1,921,638

UNITED STATES PATENT OFFICE 1,921,638

BASIC BISMUTH COMPOUND OF CAMPHO-CARBONIC ACID

George W. Raiziss and Le Roy W. Clemence, Philadelphia, Pa., assignors to Abbott Laboratories, North Chicago, Ill., a Corporation of Illinois No Drawing. Application May 19, 1930
Serial No. 453,854

3 Claims. (Cl. 260—11)

Our invention relates generally to bismuth compounds of campho-carbonic (campho-carboxylic) acid, and relates more particularly to a basic compound thereof.

A particular object of our invention is to produce a new combination of bismuth with campho-carboxylic acid which contains a comparatively high percentage of bismuth, is of low toxicity, and is therapeutically active, particularly in the treatment of spirochetic infections.

Various compounds of bismuth with campho-carboxylic acid have been discussed in the literature. Thus, Marius L. Picon (Chem. Abstracts, Sept., 1929, p. 4536, French Patent No. 657,694, Journal de Pharmacie et Chimie, Sept., 1928) mentions the preparation of a neutral bismuth campho-carbonate obtained by the action of campho-carboxylic acid (campho-carbonic acid) on anhydrous $Bi_2O_3$ in the presence of traces of water according to the following reaction:

$$6C_{10}H_{15}O.COOH + Bi_2O_3 \text{ in water medium} \rightarrow 2(C_{10}H_{15}O.COO)_3Bi + 3H_2O$$

We have made the astounding discovery that by employing large quantities of water in reacting upon campho-carboxylic acid, or a salt thereof, with a bismuth salt, particularly in a glycerine-water medium, we are enabled to obtain a basic campho-carbonate of bismuth. For example, by reacting upon sodium campho-carbonate with neutral bismuth nitrate in a 1:1 glycerine-water medium, as described below, our new basic campho-carbonate of bismuth is obtained according to the following reactions:

$$3C_{10}H_{15}O.COONa + Bi(NO_3)_3 \text{ in glycerine-water medium} \rightarrow (C_{10}H_{15}O.COO)_3Bi + 3NaNO_3.$$

$$2(C_{10}H_{15}O.COO)_3Bi + 2H_2O \rightarrow$$

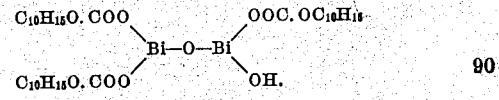

$$+ 3C_{10}H_{15}O.COOH$$

The basic bismuth compound indicated above has a bismuth content of between 39% and 40%, calculated as metallic bismuth. The value of this compound in comparison with that obtained by Picon referred to above may be readily appreciated when it is noted that Picon's bismuth product contains only about 25% of bismuth, according to his own calculations. This higher bismuth content of our product, together with low toxicity and high therapeutic value, makes our basic campho-carbonate of bismuth of high value in the treatment of spirochetic infections. Our improved product is also soluble in oils and fats.

The following example illustrates our process:

100 grams of campho-carboxylic acid (campho-carbonic acid) are dissolved in 700 cc. of distilled water at 50° C. with the aid of 50 cc. of 40% NAOH solution. The solution is filtered and 750 cc. of glycerine are added and cooled at 20° C.

67.5 grams of neutral bismuth nitrate $Bi(NO_3)_3$ are dissolved in 250 cc. of glycerine and 80 cc. water at 40° C., cooled at 20° C. and added in a slow stream to the solution of campho-carbonic acid.

Stir for one hour and filter. The precipitate is washed with 400 cc. of 1:1 glycerine, removed from the funnel, suspended in 1000 cc. of 1:1 glycerine, stirred for one hour, filtered and washed with two gallons of water.

The precipitate is again suspended in five gallons of water, mixed thoroughly, filtered and washed with water until there is no test for bismuth in the washings. It is dried in vacuo.

To purify, this product is dissolved in methyl alcohol, using smallest amount of alcohol possible; filter off any insoluble matter and precipitate with ten volumes of water. Filter, wash with water, and dry in vacuo.

As indicated above, our basic bismuth product is believed to have the constitution $$\begin{array}{c} C_{10}H_{15}O.COO \\ \diagdown \\ C_{10}H_{15}O.COO \end{array} Bi-O-Bi \begin{array}{c} OOC.OC_{10}H_{15} \\ \diagup \\ OH. \end{array}$$

This conclusion is supported by quantitative experimental results.

We ascribe the obtaining of our new bismuth compound containing a high percentage of bismuth to hydrolysis in the midst of the reaction, due to the presence of a large quantity of water which acts on the bismuth salt in statu nascendi. In order to insure the formation of the desired product, the precipitate is finally dissolved in methyl alcohol and reprecipitated with a large quantity of water, as indicated above.

Various modifications may doubtless be made in our invention without departing from the spirit thereof, and hence we do not wish to be limited to the specific procedure outlined or uses mentioned, but wish the scope of our invention to be determined entirely from the appended claims, which are to be interpreted as broadly as is consistent with the state of the art.

We claim as our invention:
1. A bismuth campho-carbonate containing from 39% to 40% of bismuth.
2. A bismuth campho-carbonate having two atoms of bismuth in the molecule for every three campho-carboxylic (campho-carbonic) acid radicals.
3. A basic bismuth salt having the probable formula:
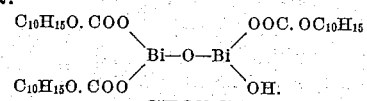
GEORGE W. RAIZISS.
LE ROY W. CLEMENCE.